US010819403B2

(12) United States Patent
Patwardhan et al.

(10) Patent No.: US 10,819,403 B2
(45) Date of Patent: *Oct. 27, 2020

(54) CHANGING STEERING MATRIX CORRESPONDING TO MU-MIMO GROUP TO ALLOW ACCESS POINTS TRANSMIT ON WIRELESS COMMUNICATION CHANNEL SIMULTANEOUSLY

(71) Applicant: Hewlett Packard Enterprise Development LP, Houston, TX (US)

(72) Inventors: Gaurav Patwardhan, Santa Clara, CA (US); Sachin Ganu, San Jose, CA (US); Mohd Shahnawaz Siraj, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/451,218

(22) Filed: Jun. 25, 2019

(65) Prior Publication Data
US 2019/0363764 A1 Nov. 28, 2019

Related U.S. Application Data

(63) Continuation of application No. 15/719,387, filed on Sep. 28, 2017, now Pat. No. 10,348,375.

(51) Int. Cl.
*H04B 7/06* (2006.01)
*H04B 7/0452* (2017.01)
(Continued)

(52) U.S. Cl.
CPC ......... *H04B 7/0452* (2013.01); *H04B 7/0456* (2013.01); *H04B 7/0617* (2013.01);
(Continued)

(58) Field of Classification Search
CPC .. H04B 7/0617; H04B 7/0619; H04B 7/0452; H04W 88/08; H04W 84/12; H04W 84/04; H04W 88/06; H04L 12/4604
(Continued)

(56) References Cited

U.S. PATENT DOCUMENTS

2008/0267142 A1   10/2008  Mushkin et al.
2015/0146812 A1*  5/2015   Chu .................... H04B 7/0417
                                                         375/267
(Continued)

OTHER PUBLICATIONS

Kumar, S. et al.; "Bringing Cross-Layer MIMO to Today's Wireless LANs"; Aug. 2013; 12 pages.
(Continued)

*Primary Examiner* — Robert J Lopata
(74) *Attorney, Agent, or Firm* — Hewlett Packard Enterprise Patent Department

(57) ABSTRACT

Example method includes: receiving, by a first access point, a plurality of beamforming feedback frames from a plurality of client devices in a WLAN; overhearing, by the first access point, a first beamforming feedback frame from a second access point; calculating, by the first access point, a second beamforming feedback frame in response to receiving a sounding frame transmitted from the second access point in the WLAN; selecting, by the first access point, a first subset of the plurality of client devices and the second access point as members of a MU-MIMO group; changing, by the first access point, a steering matrix corresponding to the MU-MIMO group based on both the received plurality of beamforming feedback frames and the calculated beamforming feedback frame to allow the first access point and the second access point transmit on a particular wireless communication channel simultaneously without interfering each other.

20 Claims, 6 Drawing Sheets

(51) Int. Cl.
*H04B 7/0456* (2017.01)
*H04W 88/08* (2009.01)
*H04W 84/12* (2009.01)

(52) U.S. Cl.
CPC ......... *H04B 7/0619* (2013.01); *H04B 7/0634* (2013.01); *H04W 84/12* (2013.01); *H04W 88/08* (2013.01)

(58) Field of Classification Search
USPC ........................................................ 370/338
See application file for complete search history.

(56) References Cited

U.S. PATENT DOCUMENTS

| | | | |
|---|---|---|---|
| 2015/0270879 A1 | 9/2015 | Chen et al. | |
| 2015/0341807 A1 | 11/2015 | Jeffery et al. | |
| 2016/0043783 A1* | 2/2016 | Xia | H04B 7/0417 370/329 |
| 2016/0157195 A1* | 6/2016 | Wang | H04W 56/001 370/350 |
| 2016/0204960 A1* | 7/2016 | Yu | H04B 7/0417 370/338 |
| 2016/0249366 A1 | 8/2016 | Seok | |
| 2016/0295513 A1* | 10/2016 | Moon | H04B 7/0634 |
| 2016/0365954 A1 | 12/2016 | Lee et al. | |
| 2017/0064566 A1* | 3/2017 | Elsherif | H04W 16/28 |
| 2017/0135085 A1* | 5/2017 | Kaushik | H04B 7/0417 |
| 2018/0063725 A1* | 3/2018 | Elsherif | H04L 5/006 |
| 2018/0124694 A1* | 5/2018 | Pefkianakis | H04B 17/336 |
| 2018/0176743 A1* | 6/2018 | Elsherif | H04B 7/0452 |
| 2018/0255547 A1* | 9/2018 | Hart | H04L 25/00 |
| 2018/0337709 A1* | 11/2018 | Zou | H04B 7/024 |
| 2018/0375597 A1* | 12/2018 | Sur | H04B 17/336 |
| 2019/0020505 A1* | 1/2019 | Hoffman | H04B 7/0626 |

OTHER PUBLICATIONS

Rahul, H. et al.; "Megamimo: Scaling Wireless Capacity with User Demands"; Aug. 2012; 12 pages.

* cited by examiner

CHANGING STEERING MATRIX CORRESPONDING TO MU-MIMO GROUP TO ALLOW ACCESS POINTS TRANSMIT ON WIRELESS COMMUNICATION CHANNEL SIMULTANEOUSLY

This application is a Continuation of U.S. Pat. No. 10,348,375, filed on Sep. 28, 2017, the contents of which is incorporated herein by reference in its entirety. The Applicant hereby rescinds any disclaimer of claim scope in the parent application or the prosecution history thereof and advices the USPTO that the claims in this application may be broader than any claim in the parent application.

BACKGROUND

In high density wireless local area network (WLAN), deployments, non-overlapping frequency bands could be scarce. As a result, adjacent access points (APs) in the WLAN may need to share access to the wireless communication channel, which may lead to channel interference to one AP in the WLAN caused by a neighboring AP's transmission.

BRIEF DESCRIPTION OF THE DRAWINGS

The following detailed description references the drawings, wherein.

DETAILED DESCRIPTION

In a typical enterprise WLAN deployment, access points adjacent to each other can use different non-overlapping frequency bands (or channels) for operation either via manual configuration or through the APs' automatic radio resource management features. However, in high density WLAN deployments, especially when the available non-overlapping channels are scarce (e.g., 2.4 GHz or via administrator imposed restrictions), nearby APs may need to operate on the same wireless frequency band. While the medium access protocols can allow sharing the access to the wireless medium, they do not increase channel reuse. Examples of the present disclosure can increase channel reuse by managing interferences from one AP's transmissions to another. Specifically, techniques disclosed in examples herein can allow neighboring APs to transmit at the same time when operating on the same channel that is within the range of each other, thereby increasing the capacity.

According to IEEE 802.11 standards, when two APs are sufficiently located close to each other physically that a clear channel assessment threshold is triggered, the two APs cannot transmit data on the channel together to avoid channel contentions. Generally, clear channel assessment (CCA) may refer to a logical function found within physical layers of a wireless communication device (e.g., an access point) which determines the current state of use of a wireless medium. In some implementations, the CCA detection threshold can be adjusted to a less sensitive value by a network administrator. However, the less sensitive CCA threshold value may cause the APs to serve a reduced set of client devices, because the AP can no longer receive requests from client devices that are located outside the reduced CCA range.

Figure 1:
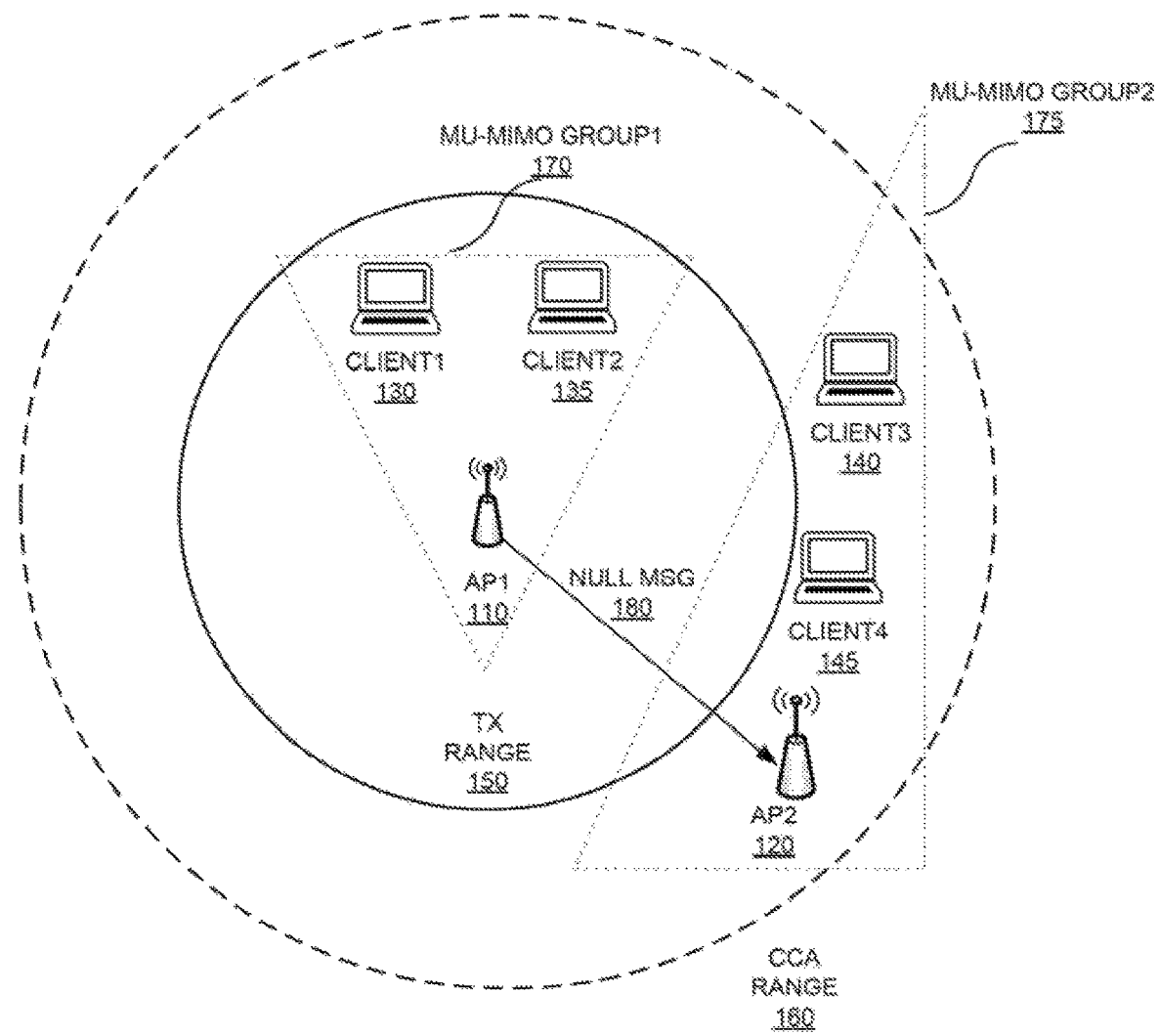
FIG. 1 is a block diagram of an example system environment for changing a steering matrix corresponding to MU-MIMO group to allow access points transmit on wireless communication channel simultaneously.

According to examples of the present disclosure, as illustrated in FIG. 1, two access points (e.g., AP1 110 and AP2 120) can transmit simultaneously on the same wireless channel even though AP2 120 is within the CCA range 160 of AP1 110. In FIG. 1, client devices Client1 130 and Client2 135 are associated with AP1 110; and, client devices Client3 140 and Client4 145 are associated with AP2 120. The dotted lines may show the range to which the CCA is triggered because of a respective AP. For example, CCA range 160 may indicate the range when CCA is triggered for AP1 110. Moreover, the solid line may show the range up to which transmitted frames can be decoded. For example, TX range 150 may indicate the transmission range up to which a frame transmitted by an access point or a client device (e.g., Client1 130 or Client2135) can be decoded by AP1 110. Note that when AP1 110 detects wireless signals on its wireless operating channel from another AP (e.g., AP2 120) that is located within CCA range 160, without techniques described herein, AP1 110 shall refrain from transmitting on the wireless operating channel for a period of time.

As used herein, "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards. As used herein, a "client device" may include a notebook, tablet, mobile phone, and/or other mobile device that can utilize a WLAN connection. As used herein, "wireless local area network" (WLAN) generally may refer to a communications network links two or more devices using some wireless distribution method (for example, spread-spectrum or orthogonal frequency-division multiplexing radio), and usually providing a connection through an access point to the Internet. and thus, providing users with the mobility to move around within a local coverage area and still stay connected to the network.

In order to transmit data to Client1 130 and Client2 135, AP1 110 can create a MU-MIMO group 170 that includes both Client1 130 and Client2 135; Likewise, in order to transmit data to Client3 140 and Client4 145, AP2 120 can create a MU-MIMO group 180 that includes both Client3 140 and Client4 145.

The multi-user MIMO technique works by taking advantage of beamforming to send frames to spatially diverse locations at the same time. As used herein, "beamforming" generally may refer to a way of wireless transmission that allows a transmitter to focus energy toward a receiver. Beamformees can be selected by calculating a steering matrix for an antenna array of the access point. The steering matrix generally may refer to a mathematical description of how the antenna array uses each individual element to select a spatial path for the data transmission.

However, as AP1 110 forms the MU-MIMO group 170 including Client1 130 and Client2 135, AP1 110 may also trigger the CCA at AP2 120, which is located within CCA range 160 but outside Tx range 150. As mentioned above, if CCA is triggered at AP2 120, which means that AP2 120 detects a transmission signal from AP1 110 that is stronger than the CCA threshold value, then AP2 120 cannot transmit simultaneously on the same wireless communication channel as AP1 110.

To increase the likelihood of simultaneous transmission on the same wireless communication channel by AP1 110 and AP2 120, when AP1 110 forms the MU-MIMO group, AP1 110 may treat AP2 120 as one of its client devices. Therefore, the MU-MIMO group 170 formed by AP1 110 can be modified to include Client1 130, Client2 135, and AP2 120. Then, AP1 110 will follow a MU-MIMO sounding protocol to sound the channel between AP110 and each of Client1 130, Client2 135, and AP2 120. In a MU-MIMO transmission towards multiple client devices, one intended client device will receive the data transmission, whereas the other client devices in the same MU-MIMO group will receive a NULL frame. Therefore, when AP2 120 is a member of the MU-MIMO group 170, when AP1 110 transmission data frames to Client2 135, both Client1 130 and AP2 120 will receive NULL frames, e.g., NULL message 180. As a result of the MU-MIMO sounding between AP1 110 and AP2 120, AP1 110 can be informed of the channel condition between AP1 110 and AP2 120.

Since in this example, AP1 110 and AP2 120 operate on the same channel, sounding frames sent by AP2 120 to its own clients (e.g., Client3 140 and Client4 145) can be heard by AP1 110 as well. Assuming that the channel is symmetric, the beamforming steering matrix V generated at AP1 110 can be used to create a NULL message 180 to transmit in AP2 120's direction, which can reduce the chance that the CCA is triggered at AP2 120. In summary, by changing the MU-MIMO steering matrix based on the explicit sounding process between AP1 110 and AP2 120, AP1 110 can selectively isolate AP2 120 while maintaining connections to the farthest client device of AP1 110.

Figure 2:
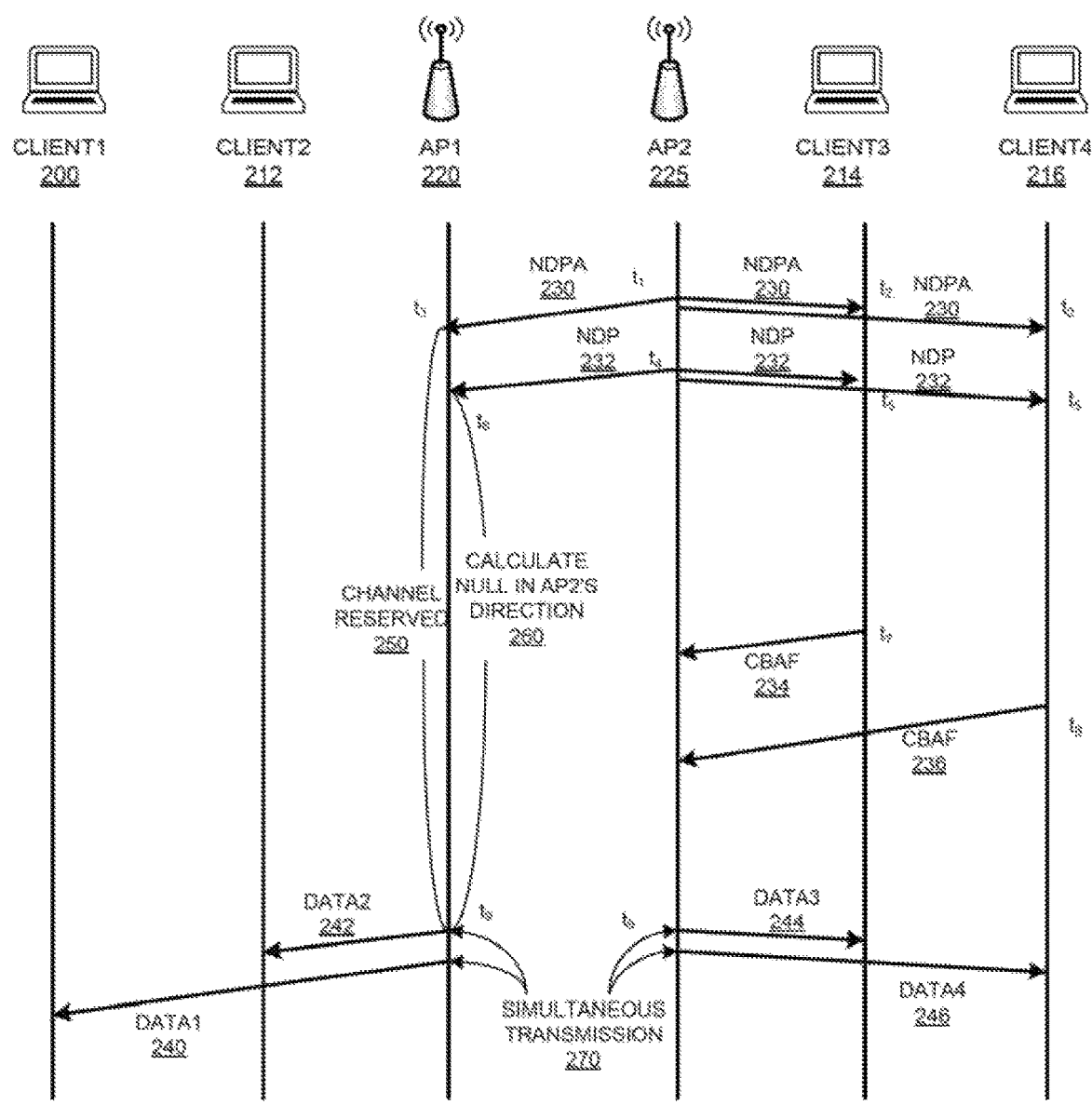
FIG. 2 is a sequence diagram illustrating example communication sequences for changing a steering matrix corresponding to MU-MIMO group to allow access points transmit on wireless communication channel simultaneously.

FIG. 2 is a sequence diagram illustrating example communication sequences for changing a steering matrix corresponding to MU-MIMO group to allow access points transmit on wireless communication channel simultaneously. FIG. 2 includes, for example, AP1 220, AP2 225, and a plurality of client devices, such as, Client1 200, Client2 212, Client3 214, and Client4 216. In this example, assuming that Client1 200 and Client2 212 are associated with AP1 220; and, Client3 214 and Client4 216 are associated with AP2 225. According to techniques described above, AP1 220 can form a MU-MIMO group that includes Client1 200, Client2 212, and AP2 225. Similarly, AP2 can form a MU-MIMO group that includes Client3 214, Client4 216, and AP1 220.

At time point $t_1$, AP2 225 sends a Null Data Packet Announcement (NDPA) 230. NDPA 230 is received by Client3 214 and Client4 216 at time point $t_2$. Moreover, AP1 220 also receives the NDPA 230 at time point $t_3$. Upon transmission of NDPA 230, AP2 225 next transmits a Null Data Packet (NDP) frame 232, which is the frame used to calibrate the channel. NDP 232 is subsequently received by Client3 214 and Client4 216 at time point $t_5$. Also, AP1 220 can receive the NDP 232 at time point $t_6$.

In some examples, AP2 225 can transmit from each of its antennas one at a time. The header of NDP 232 can identify which antenna the frame is sent from. A beamformee device can record information about how it receives a sounding frame on each of its antennas individually. This results in an M to N relation over the number of antennas at AP2 225 and the number of antennas at the client device (e.g., Client3 214). The client device may record the following data for every MN relation: (1) the strength of the signal measured by its amplitude; and (2) the time it received the signal. The differences in these times can be recorded in a matrix, which is also known as Channel State Information (CSI). CSI can then be compressed and returned to AP2 225 in a compressed beamforming action feedback frame (CBAF) 234. The targeted beamformees need to reply with CBAF 234. In some examples, the intended client device may reply immediately whereas the other beamformees in the MU-MIMO group may wait to be polled by the beamformer (e.g., AP2 225). In the example, illustrated in FIG. 2, Client3 214 returns CBAF 234 at time point $t_7$, and thereafter, Client4 216 returns CBAF 236 to AP2 225 at time point $t_8$. AP2 225 can then calculate steering matrix that determines how to beamform to Client3 214 and Client4 216 based on CBAF 234 and 236.

On the other hand, at time point $t_3$, when AP1 220 receives NDPA 230 from AP2 225 on the same operating channel as AP1 220, AP1 220 may indicate the channel as reserved 250. Thereafter, when AP1 220 receives NDP 232 at time point $t_6$, AP1 220 can calculate a NULL frame in AP2's direction 260 based on information received within NDP 232. The calculation of NULL frame is similar to how a client device calculates the CBAF based on a NDP frame, although no actual frame is transmitted from AP1 220 to AP2 225 in this example. However, AP1 220 can adjust its steering matrix for MU-MIMO group based at least in part on the NULL frame calculation. With the adjusted steering matrix, data transmissions targeted to Client1 200 and Client2 212 can have little interference to AP2 225.

Note that the channel reservation, calibration, and NULL frame calculation can be done symmetrically by AP2 225 in the same fashion. Therefore, both AP1 220 and AP2 225 can adjust their respective steering matrix to reduce interference to each other. As a result, at time point $t_9$, AP1 220 and AP2 225 can start simultaneous transmission 270 on the same wireless communication channel. Specifically, AP1 220 can transmit Data1 240 to Client1 200, Data2 242 to Client2 212; and, AP2 225 can transmit Data3 244 to Client3 214, Data4 246 to Client4 216.

Figure 3:
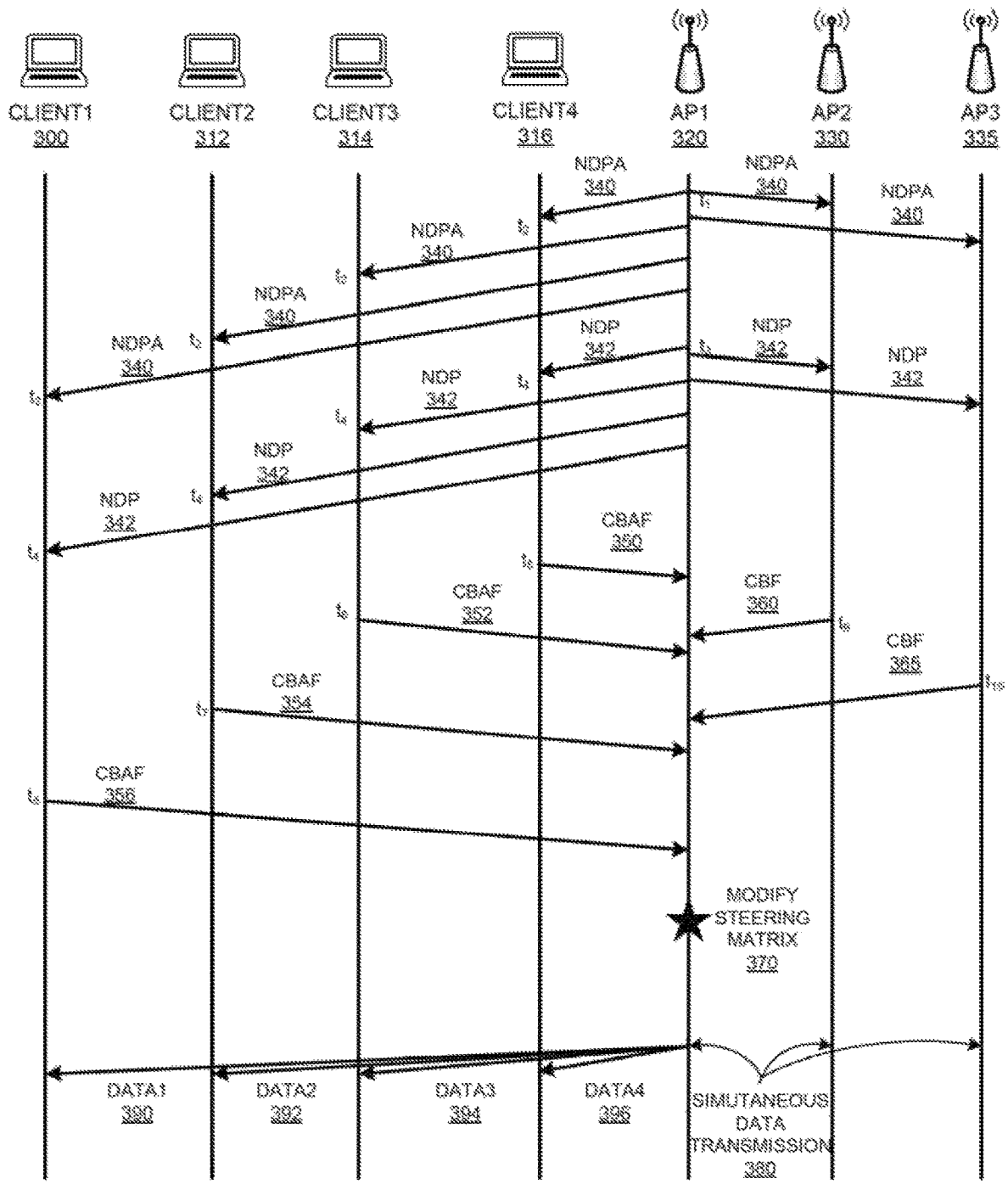
FIG. 3 is a sequence diagram illustrating example communication sequences for changing a steering matrix corresponding to MU-MIMO group to allow access points transmit on wireless communication channel simultaneously.

FIG. 3 is a sequence diagram illustrating example communication sequences for changing a steering matrix corresponding to MU-MIMO group to allow access points transmit on wireless communication channel simultaneously. FIG. 3 includes, for example, AP1 320, AP2 330, and AP3 335, as well as a plurality of client devices, such as, Client1 300, Client2 312, Client3 314, and Client4 316. In this example, assuming that Client1 300, Client2 312, Client3 314, and Client4 316 are associated with AP1 320. Also, assuming that AP2 330 and AP3 335 are within the neighborhood of AP1 320 and operate on the same wireless communication channel as AP1 320 so that the APs can hear the signals transmitted from each other. In this example, the APs are connected to each other via wired connections, which is common in wireless local area network (WLAN) deployment. Here, AP1 320 can form a MU-MIMO group that includes Client1 300, Client2 312, Client3 314, and Client4 316 in order to simultaneously transmit data to those client devices.

At time point $t_1$, AP1 320 sends a Null Data Packet Announcement (NDPA) 340. NDPA 340 may be received by Client1 300, Client2 312, Client3 314, and Client4 316 at time point $t_2$. Moreover, AP2 330 and AP3 335 can also receive the NDPA 340. Upon transmission of NDPA 340, at time point $t_3$, AP1 320 next transmits a Null Data Packet (NDP) frame 342, which is the frame used to calibrate the channel state. NDP 342 is subsequently received by Client1 300, Client2 312, Client3 314, and Client4 316 at time point $t_4$. Also, AP1 220 can receive the NDP 232 at time point $t_6$.

Each beamformee need to reply with compressed beamforming action feedback (CBAF) frame 234. In some examples, the intended client device may reply immediately, whereas the other beamformees in the MU-MIMO group may wait to be polled by the beamformer (e.g., AP1 320). In the example, illustrated in FIG. 3, Client4 316 returns CBAF 350 at time point $t_5$; Client3 314 returns CBAF 352 at time point $t_6$; Client2 312 returns CBAF 354 at time point $t_7$; and thereafter, Client1 300 returns CBAF 356 to AP1 320 at time point $t_6$.

Then, AP1 320 can determine how much nulling AP2 330 and AP3 335 may affect data transmissions to Client1 300, Client2 312, Client3 314, and Client4 316, vice versa. To make such determination, AP1 320 first can determine the channel state information (CSI) between a client device (e.g., Client1 300) and itself based on the CBAFs (e.g., CBAFs 350-356) received from each client device in the MU-MIMO group.

In addition, AP1 320 can also determine the channel state between AP1 320 and AP2 330 based on a received compressed beamforming feedback (CBF) frame 360 over the wired connection between AP1 320 and AP2 330. In this example, AP2 330 receives an NDP frame from AP1 320 and calculates the channel state information based on the signals associated with NDP frame as well as the information stored in the NDP frame. The channel state information is returned to AP1 320 in the CBF frame 360 by AP2 330 at time point $t_9$. Likewise, AP1 320 can determine the channel state between AP1 320 and AP3 335 based on a CBF 365 transmitted by AP3 335 over the wired connection between AP1 320 and AP3 335 at time point $t_{10}$.

In some examples, if the CBF is not received from AP2 330 or if the received CBF is state, AP1 320 can create channel state by assuming that the channel is symmetric, and calculating the NULL frame in AP2 330's direction based on a NDP received from AP2 330, and the NULL frame in AP3 335's direction based on a different NDP received from AP3 335.

Next, AP1 320 can calculate a steering matrix 370 that determines how to beamform to Client1 300, Client2 312, Client3 314, and Client4 316 based on CBAFs 350, 352, 354, and 356. Furthermore, AP1 320 can create a covariance matrix from the client device (e.g., Client1 300) and AP2 330 channel matrices. The rank of this covariance matrix may indicate whether the channel state information of a client device in the MU-MIMO group (e.g., Client1 300) and a neighboring AP (e.g., AP2 330) are linearly independent. For example, a high rank may indicate that the channels are independent, which implies that AP1 320 may null out a neighboring AP (e.g., AP2 330) without affecting data transmission to the client device in its MU-MIMO group (e.g., Client1 300). On the other hand, a low rank may indicate that the channels are not independent with each other, which implies that AP1 320 may not transfer data simultaneously with a neighboring AP (e.g., AP2 330) without affecting each other. Based on the covariance matrix, AP1 320 adjust the MU-MIMO group membership and the steering matrix 370, such that AP1 320 can simultaneously transmit Data1 390 to Client1 300, Data2 392 to Client2 312, Data3 394 to Client3 314, and Data4 396 to Client4 316. Meanwhile, AP2 330 and AP3 335 may be allowed simultaneous data transmission 380 on the same wireless communication channel as well.

Table 1 below shows an example table that AP1 320 can maintain to indicate channel states between every associated client device in the MU-MIMO group and each neighbor AP operating on the same channel.

TABLE 1

| Table at AP1 320 | AP2 330 | AP3 335 |
| --- | --- | --- |
| Client1 300 | High rank | High rank |
| Client2 312 | High rank | High rank |
| Client3 314 | High rank | Low rank |
| Client4 316 | High rank | Low rank |

AP1 320 performs such computation, because even if a client device (e.g., Client1 300) and a neighboring AP (e.g., AP2 330) are not in the same location, their channel state might be similar. Thus, data transmissions involving the client device (e.g., Client1 300) may affect data transmissions involving a neighboring AP (e.g., AP2 330), and vice versa. Based on information in Table 1 above, AP1 320 can send data to client devices. For example, if AP1 320 plans to transmit a data packet to Client1 300, Client2 312, and Client3 314; then, AP1 320 can look up in the table and determine to null out AP2 330 but not AP3 335, in case AP1 320 plans to send data packet to Client1 300, Client2 312, and Client3 314 simultaneously. This is because AP2 330 has a high rank in the covariance matrix associated with Client1 300, Client2 312, and Client3 314, whereas AP3 335 has a low rank in the covariance matrix associated with Client3 314. Accordingly, AP1 320 can change its steering matrix 370 based on the CBAFs received from Client1 300, Client2 312, and Client3 314 and the CBF received from AP2 330. When AP1 320 use the resulting steering matrix 370 for beamforming, MU-MIMO data transmission from AP1 320 will be targeted to Client1 300, Client2 312, and Client3 314 and away from AP2 330. Therefore, the CCA threshold is unlikely to be triggered at AP2 330 due to AP1 320's data transmission. Thus, AP2 330 can simultaneously transmit data packets to its own associated client devices. AP3 335, on the other hand, will refrain from any data transmission during the time when AP1 320 is transmitting data to its client devices (e.g., Client1 300, Client2 312, and Client3 314). Here, AP3 335 has a low rank in the covariance matrix associated with Client3 314, possibly because Client3 314 is in the same direction as AP3 335 relative to AP1 320.

As another example, if AP1 320 plans to send data packets to Client1 300 and Client2 312, but not to Client3 314 and Client4 316, then AP1 320 can null out both AP2 330 and AP3 335 based on the information in Table 1. This is because both AP2 330 and AP3 335 have high rank in the covariance matrix associated with Client1 300 and Client2 312. In other words, both AP2 330 and AP3 335 can transmit to its own associated client devices at the same time on the same wireless communication channel as AP1 320. In this example, the MU-MIMO group may include all four client devices (e.g., Client1 300, Client2 312, Client3 314, and Client4 316), but AP1 320 has data packets to transmit to Client1 300 and Client2 312, not Client3 314 and Client4 316. However, the same computation can also apply to the case where the MU-MIMO group includes two client devices, namely, Client1 300 and Client2 312.

In some examples, after AP1 320 receives CBAFs from client devices, AP1 320 selects a set of client devices to become members of a MU-MIMO group. During the MU-MIMO group membership selection, AP1 320 determines a set of neighboring APs that can become a part of the same MU-MIMO group. Also, AP1 320 determines a subset of its client devices that are compatible with the set of neighboring APs in the MU-MIMO group, so that data transmissions to the subset of client devices can be null out at the neighboring APs in the MU-MIMO group.

In some examples; when AP1 320 detects that the amount of active traffic associated with its client devices (e.g., Client1 300, Client2 312, Client3 314, and Client4 316) is relatively low, then AP1 320 may give preference to include a greater number of APs in the MU-MIMO group. In this case, because the neighboring AP has a high priority to be included in the MU-MIMO group, if a client device is incompatible with the neighboring AP, then client device will be excluded from the MU-MIMO group.

In some examples, when AP1 320 determines that its own associated client, devices have high priority data transmissions, then AP1 320 may give preference to include its client devices in the MU-MIMO group, and exclude any neighboring AP that is incompatible with the client devices from the MU-MIMO group.

In this way, every AP makes a decision to null out a number of its neighboring APs. This can increase the overall spatial reuse in the network. Moreover, this increase in the network's throughput does not lead to any sacrifice of other resources in the network.

Figure 4:
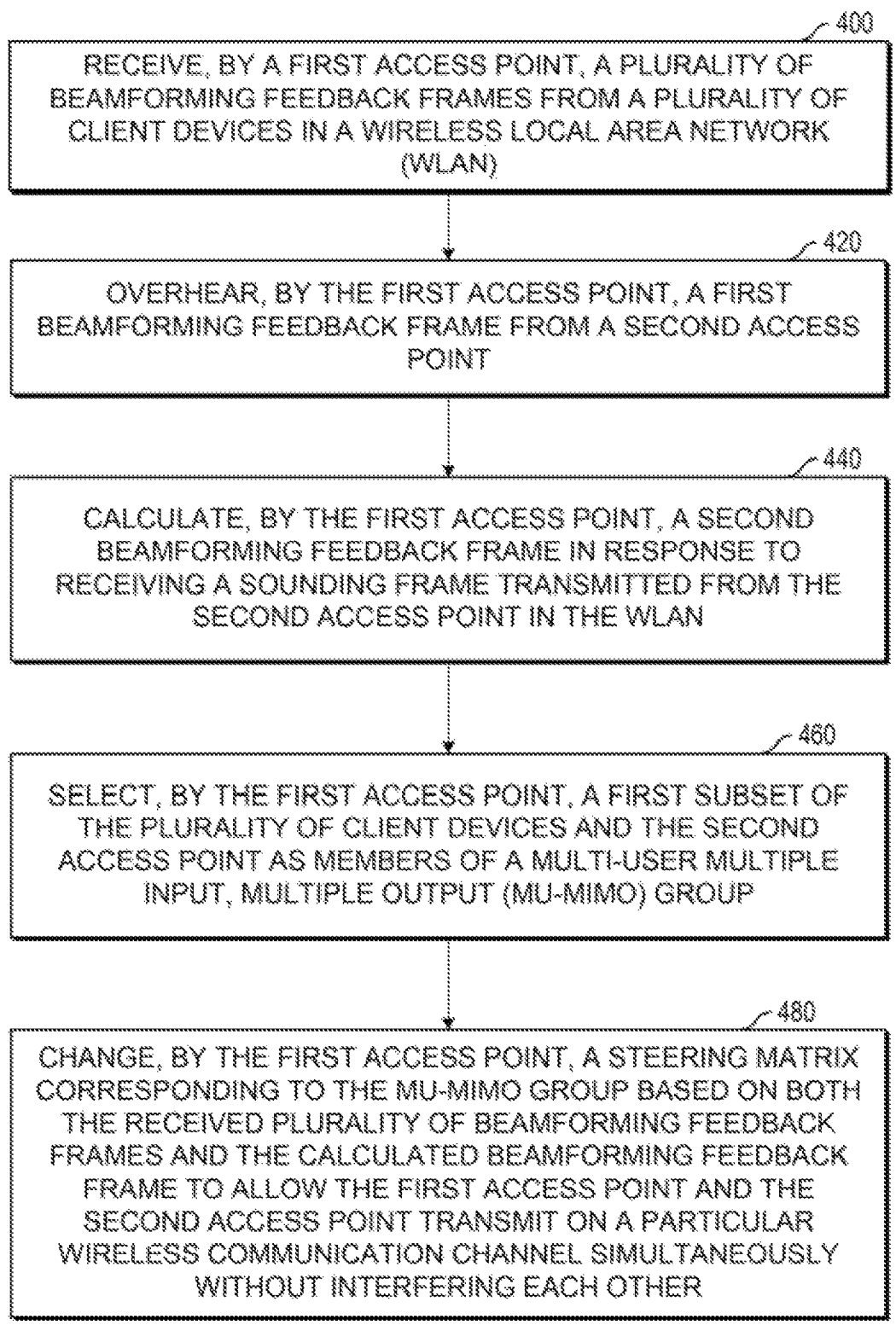
FIG. 4 is a flowchart of an example process of changing a steering matrix corresponding to MU-MIMO group to allow access points transmit on wireless communication channel simultaneously.

Processes of Changing Steering Matrix Corresponding to MU-MIMO Group to Allow Access Points Transmit on Wireless Communication Channel Simultaneously FIG. 4 is a flowchart of an example process of changing a steering matrix corresponding to MU-MIMO group to allow access points transmit on wireless communication channel simultaneously. During operations, a first access point can receive a plurality of beamforming feedback frames from a plurality of client devices in a wireless local area network (WLAN) (operation 400). Subsequently, the first access point can overhear a first beamforming feedback frame from a second access point (operation 420). Then, the first access point can calculate a second beamforming feedback frame in response to receiving a sounding frame transmitted from the second access point in the WLAN (operation 440). Furthermore, the first access point can select a first subset of the plurality of client devices and the second access point as members of a multi-user multiple input, multiple output (MU-MIMO) group (operation 460). Also, the first access point changing a steering matrix corresponding to the MU-MIMO group based on both the received plurality of beamforming feedback frames and the calculated beamforming feedback frame to allow the first access point and the second access point transmit on a particular wireless communication channel simultaneously without interfering each other (operation 480).

Figure 5:
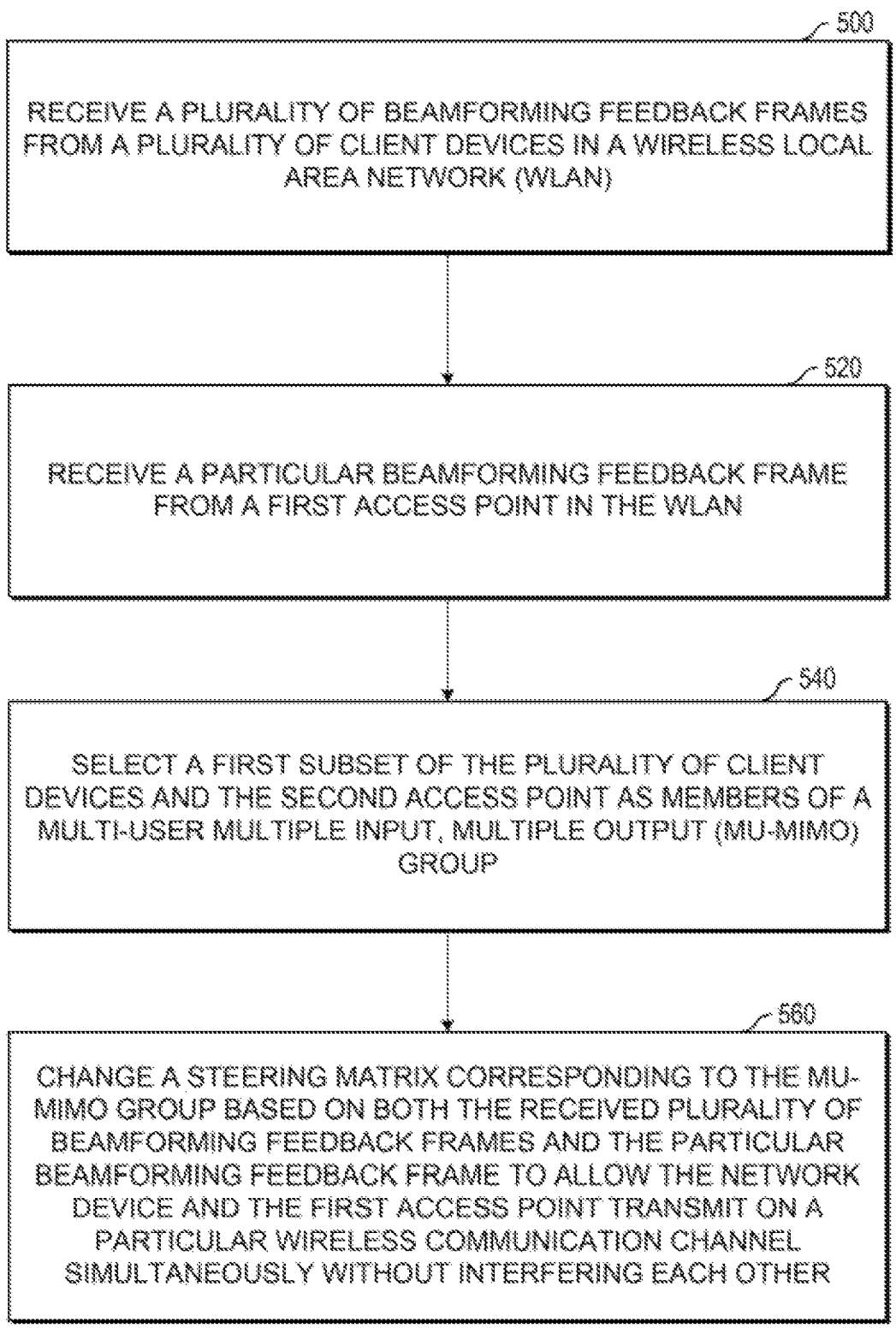
FIG. 5 is a flowchart of an example process of changing a steering matrix corresponding to MU-MIMO group to allow access points transmit on wireless communication channel simultaneously.

FIG. 5 is a flowchart of an example process of changing a steering matrix corresponding to MU-MIMO group to allow access points transmit on wireless communication channel simultaneously. Unlike the example in FIG. 4, the neighboring APs in FIG. 5 provides explicit feedback frame to the access point via a wired and/or wireless connection between the neighboring APs and the access point.

During operations, a network device (e.g., an access point) can receive a plurality of beamforming feedback frames from a plurality of client devices in a wireless local area network. (WLAN) (operation 500). Subsequently, the network device can receive a particular beamforming feedback frame from a first access point in the WLAN (operation 520). Furthermore, the network device can select a first subset of the plurality of client devices and the second access point as members of a multi-user multiple input, multiple output (MU-MIMO) group (operation 540). Also, the network device can change a steering matrix corresponding to the MU-MIMO group based on both the received plurality of beamforming feedback frames and the particular beamforming feedback frame to allow the network device and the first access point transmit on a particular wireless communication channel simultaneously without interfering each other (operation 560).

In some examples, the plurality of beamforming feedback frames and the second beamforming feedback frame may include a plurality of compressed beamforming action frames (CBAFs). The plurality of CBAFs may be received in response to the first access point transmitting a null data packet (NDP) frame.

In some examples, the first access point may transmit a NDP announcement frame (NDPA) prior to transmitting the NDP frame.

In some examples, selecting the subset of the plurality of client devices and the second access point as members of the MU-MIMO group involves including the second access point in a rank calculation, wherein the second access point is treated as a client device of the first access point for the rank calculation.

The first access point may include a radio comprising multiple spatial streams, each spatial stream is steered toward a respective member of MU-MIMO group except the second access point according to the rank calculation.

In some examples, the first access point can further determine that including the second access point in the MU-MIMO group triggers a clear channel assessment (CCA) threshold, and exclude the second access point from the MU-MIMO group.

In some examples, the first access point can further determine that transmitting to a second subset of client devices interferes with wireless transmission of the second access point, wherein network traffic transmitted to the second subset of client devices is low. Then, the first access point can determine that the second access point serves a number of active client devices, and exclude the second subset of client devices from the MU-MIMO group to allow the first access point and the second access point transmit on the particular wireless communication channel simultaneously without interfering each other.

In some examples, the first access point can determine that transmitting to a particular client device in the first subset of client devices interferes with wireless transmission of a third access point, whereas the particular client device is inactive. Then, the first access point can include the third access point in the MU-MIMO group to allow the first access point, the second access point; and the third access point transmit on the particular wireless communication channel simultaneously without interfering each other.

As used herein, "network device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like. For example, a "network device may refer to a network controller that comprises a hardware or a combination of hardware and software that enables connection between client devices and computer networks. In some implementations, a network device may refer to a server computing device (e.g., on-premise server, private, public, or hybrid cloud server) that comprises a hardware or a combination of hardware and software that can process and/or display network-related information. In some implementations, a network device may refer to an access point acting as a virtual master network controller among a cluster of access points.

As used herein, 'access point' (AP) generally refers to receiving points for any known or convenient wireless access technology which may later become known. Specifically, the term AP is not intended to be limited to IEEE 802.11-based APs. APs generally function as an electronic device that is adapted to allow Wireless devices to connect to a wired network via various communications standards.

Figure 6:
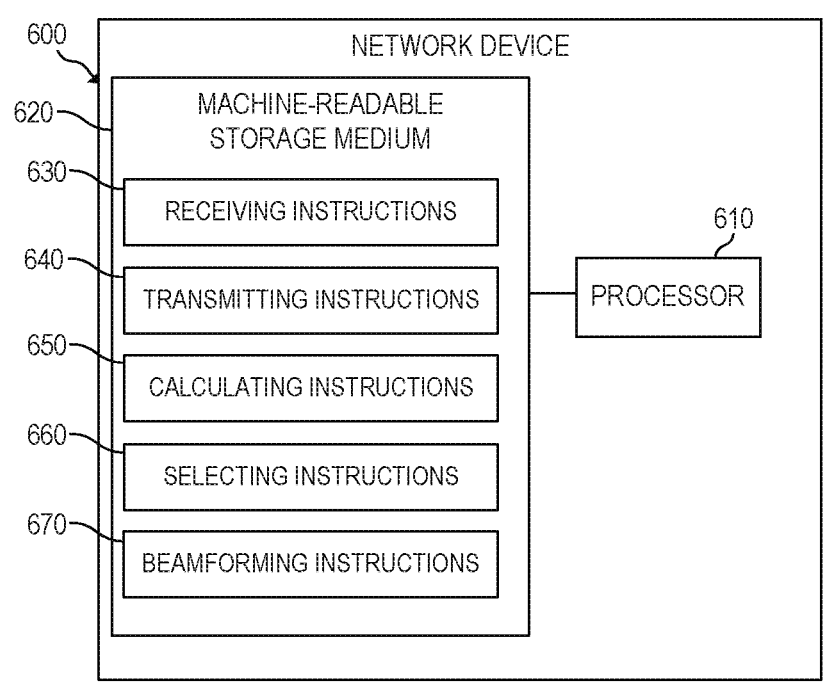
FIG. 6 is a block diagram of an example network device to change a steering matrix corresponding to MU-MIMO group to allow access points transmit on wireless communication channel simultaneously.

Network Device to Change Steering Matrix Corresponding to MU-MIMO Group to Allow Access Points Transmit on Wireless Communication Channel Simultaneously FIG. 6 is a block diagram of an example network device to change a steering matrix corresponding to MU-MIMO group to allow access points transmit on wireless communication channel simultaneously.

As used herein, a network device may be implemented, at least in part, by a combination of hardware and programming. For example, the hardware may comprise at least one processor (e.g., processor 610) and the programming may comprise instructions, executable by the processor(s), stored on at least one machine-readable storage medium (e.g., 620). In addition, a network device may also include embedded memory and a software that can be executed in a host system and serve as a driver of the embedded memory. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof.

The at least one processor 610 may fetch, decode, and execute instructions stored on storage medium 620 to perform the functionalities described below in relation to receiving instructions 630, transmitting instructions 540, calculating instructions 650, selecting instructions 660, and beamforming instructions 670. In other examples, the functionalities of any of the instructions of storage medium 620 may be implemented in the form of electronic circuitry, in the form of executable instructions encoded on a machine-readable storage medium, or a combination thereof. The storage medium may be located either in the computing device executing the machine-readable instructions, or remote from but accessible to the computing device (e.g., via a computer network) for execution. In the example of FIG. 6, storage medium 620 may be implemented by one machine-readable storage medium, or multiple machine-readable storage media.

Although network device 600 includes at least one processor 610 and machine-readable storage medium 620, it may also include other suitable components, such as additional processing component(s) (e.g., processor(s), ASIC(s), etc.), storage (e.g., storage drive(s), etc.), or a combination thereof.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc; a DVD, etc.), and the like, or a combination thereof. Further, any machine-readable storage medium described herein may be non-transitory. In examples described herein, a machine-readable storage medium or media may be part of an article (or article of manufacture). An article or article of manufacture may refer to any manufactured single component or multiple components.

Specifically, instructions 630-670 may be executed by processor 610 to: receive a plurality of beamforming feedback frames from a plurality of client devices in a wireless local area network (WLAN); overhear a first beamforming feedback frame from a second access point; calculate a second beamforming feedback frame in response to receiving a sounding frame transmitted from the second access point in the WLAN; select a first subset of the plurality of client devices and the second access point as members of a multi-user multiple input, multiple output (MU-MIMO) group; change a steering matrix corresponding to the MU-MIMO group based on both the received plurality of beamforming feedback frames and the calculated beamforming feedback frame to allow the first access point and the second access point transmit on a particular wireless communication channel simultaneously without interfering each other; receive a particular beamforming feedback frame from a first access point in the WLAN; change a steering matrix corresponding to the MU-MIMO group based on both the received plurality of beamforming feedback frames and the particular beamforming feedback frame to allow the network device and the first access point transmit on a particular wireless communication channel simultaneously without interfering each other; etc.

Moreover, instructions 630-670 may also be executed by processor 610 to: determine that including the second access point in the MU-MIMO group triggers a clear channel assessment (OCA) threshold; exclude the second access point from the MU-MIMO group; determine that transmitting to a second subset of client devices interferes with wireless transmission of the second access point, wherein network traffic transmitted to the second subset of client devices is low; determine that the second access point serves a number of active client devices; exclude the second subset of client devices from the MU-MIMO group to allow the first access point and the second access point transmit on the particular wireless communication channel simultaneously without interfering each other; determine that transmitting to a particular client device in the first subset of client devices interferes with wireless transmission of a third access point, wherein the particular client device is inactive; include the third access point in the MU-MIMO group to allow the first access point, the second access point, and the third access point transmit on the particular wireless communication channel simultaneously without interfering each other; etc.

We claim:

1. A method comprising:
   selecting, by a first access point, a first subset of a plurality of client devices of a wireless local area network (WLAN) and a second access point of the WLAN as members of a multi-user multiple input, multiple output (MU-MIMO) group;
   changing, by the first access point, a steering matrix corresponding to the MU-MIMO group based on both a received plurality of feedback frames and a calculated beamforming feedback frame to allow the first access point and the second access point to transmit on a particular wireless communication channel simultaneously.

2. The method of claim 1, wherein the calculated beamforming feedback frame is calculated based in part on a null frame transmitted from the second access point in the WLAN.

3. The method of claim 2, further comprising:
receiving a plurality of beamforming feedback frames, the beamforming feedback frames comprising a plurality of compressed beamforming action frames (CBAFs).

4. The method of claim 3, wherein the plurality of CBAFs are received in response to the first access point transmitting a null data packet (NDP) frame.

5. The method of claim 1, wherein selecting the subset of the plurality of client devices and the second access point as members of the MU-MIMO group comprises including the second access point in a rank calculation, wherein the second access point is treated as a client device of the first access point for the rank calculation.

6. The method of claim 5, wherein the first access point includes a radio comprising multiple spatial streams, each spatial stream is steered toward a respective member of MU-MIMO group except the second access point according to the rank calculation.

7. The method of claim 1, further comprising:
determining that including the second access point in the MU-MIMO group triggers a clear channel assessment (CCA) threshold; and
excluding the second access point from the MU-MIMO group.

8. The method of claim 1, further comprising:
determining that transmitting to a second subset of client devices interferes with wireless transmission of the second access point, wherein network traffic transmitted to the second subset of client devices is low;
determining that the second access point serves a number of active client devices; and
excluding the second subset of client devices from the MU-MIMO group to allow the first access point and the second access point transmit on the particular wireless communication channel simultaneously.

9. The method of claim 1, further comprising:
determining that transmitting to a particular client device in the first subset of client devices interferes with wireless transmission of a third access point, wherein the particular client device is inactive; and
including the third access point in the MU-MIMO group to allow the first access point, the second access point, and the third access point transmit on the particular wireless communication channel simultaneously.

10. A first access point, comprising at least:
a processor;
a memory storing instructions which, when executed by the processor, cause the first access point to:
select a first subset of a plurality of client devices of a wireless local area network (WLAN) and a second access point of the WLAN as members of a multi-user multiple input, multiple output (MU-MIMO) group;
change, a steering matrix corresponding to the MU-MIMO group based on both a received plurality of feedback frames and a calculated beamforming feedback frame to allow the first access point and the second access point to transmit on a particular wireless communication channel simultaneously.

11. The first access point of claim 10, wherein the calculated beamforming feedback frame is calculated based in part on a null frame transmitted from the second access point in the WLAN.

12. The first access point of claim 11, further comprising:
receiving a plurality of beamforming feedback frames, the beamforming feedback frames comprising a plurality of compressed beamforming action frames (CBAFs).

13. The first access point of claim 12, wherein the plurality of CBAFs are received in response to the first access point transmitting a null data packet (NDP) frame.

14. The first access point of claim 10, wherein selecting the subset of the plurality of client devices and the second access point as members of the MU-MIMO group comprises including the second access point in a rank calculation, wherein the second access point is treated as a client device of the first access point for the rank calculation.

15. The first access point of claim 14, wherein the first access point includes a radio comprising multiple spatial streams, each spatial stream is steered toward a respective member of MU-MIMO group except the second access point according to the rank calculation.

16. The first access point of claim 10, further comprising:
determining that including the second access point in the MU-MIMO group triggers a clear channel assessment (CCA) threshold; and
excluding the second access point from the MU-MIMO group.

17. The first access point of claim 10, further comprising:
determining that transmitting to a second subset of client devices interferes with wireless transmission of the second access point, wherein network traffic transmitted to the second subset of client devices is low;
determining that the second access point serves a number of active client devices; and
excluding the second subset of client devices from the MU-MIMO group to allow the first access point and the second access point transmit on the particular wireless communication channel simultaneously.

18. The first access point of claim 10, further comprising:
determining that transmitting to a particular client device in the first subset of client devices interferes with wireless transmission of a third access point, wherein the particular client device is inactive; and
including the third access point in the MU-MIMO group to allow the first access point, the second access point, and the third access point transmit on the particular wireless communication channel simultaneously.

19. A non-transitory machine-readable storage medium encoded with instructions executable by at least one processor of a first access point, the machine-readable storage medium comprising instructions to:
select a first subset of a plurality of client devices of a wireless local area network (WLAN) and a second access point of the WLAN as members of a multi-user multiple input, multiple output (MU-MIMO) group;
change, a steering matrix corresponding to the MU-MIMO group based on both a received plurality of feedback frames and a calculated beamforming feedback frame to allow the first access point and the second access point to transmit on a particular wireless communication channel simultaneously.

20. The non-transitory machine-readable storage medium of claim 19, wherein the calculated beamforming feedback frame is calculated based in part on a null frame transmitted from the second access point in the WLAN.

\* \* \* \* \*